| (12) | United States Patent  
Pai et al. | (10) Patent No.: US 10,976,881 B2  
(45) Date of Patent: *Apr. 13, 2021 |

(54) COMPLEX TRANSPARENT TOUCH SENSOR

(71) Applicants: Chih-Chiang Pai, Taoyuan (TW);
Meng-Kuei Lin, Taoyuan (TW);
Chin-Fong Lin, Taoyuan (TW);
Chiu-Wen Chen, Taoyuan (TW)

(72) Inventors: Chih-Chiang Pai, Taoyuan (TW);
Meng-Kuei Lin, Taoyuan (TW);
Chin-Fong Lin, Taoyuan (TW);
Chiu-Wen Chen, Taoyuan (TW)

(73) Assignee: YOUNG FAST OPTOELECTRONICS CO., LTD., Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/740,477

(22) Filed: Jan. 12, 2020

(65) Prior Publication Data

US 2020/0150827 A1 May 14, 2020

Related U.S. Application Data

(63) Continuation-in-part of application No. 15/993,651, filed on May 31, 2018, now abandoned.

(51) Int. Cl.
*G06F 3/044* (2006.01)

(52) U.S. Cl.
CPC .. *G06F 3/0446* (2019.05); *G06F 2203/04112* (2013.01)

(58) Field of Classification Search
CPC ................................ G06F 3/044; G06F 3/0446
See application file for complete search history.

(56) References Cited

U.S. PATENT DOCUMENTS

| 10,725,596 | B2* | 7/2020 | Pai | G06F 3/046 |
| 2016/0139701 | A1* | 5/2016 | Wang | G06F 3/044 |
| | | | | 345/174 |
| 2016/0179266 | A1* | 6/2016 | Yang | G06F 3/0416 |
| | | | | 345/174 |

* cited by examiner

*Primary Examiner* — Kent W Chang
*Assistant Examiner* — Scott D Au

(57) ABSTRACT

A touch sensor includes a first sensing layer, a second sensing layer and an insulative layer therebetween. Each of the first sensing layer and the second sensing layer has capacitive sensing strings and electromagnetic antenna strings. Each capacitive sensing string is composed of capacitive sensing units. The electromagnetic antenna strings are arranged. Each of the capacitive sensing strings and the electromagnetic antenna strings is connected with a tiny wire. The capacitive sensing strings on the first sensing layer are crossed with the second capacitive sensing strings on the second sensing layer to form complementary patterns. The capacitive sensing units on the first sensing layer and the second capacitive sensing units on the second sensing layer form a grid-shaped capacitive sensing unit matrix. The electromagnetic antenna strings on the first sensing layer are crossed with the electromagnetic antenna strings on the second sensing layer to form a grid-shaped electromagnetic antenna matrix.

2 Claims, 5 Drawing Sheets

COMPLEX TRANSPARENT TOUCH SENSOR

CROSS-REFERENCE TO RELATED APPLICATIONS

This application is a continuation-in-part of U.S. patent application Ser. No. 15/993,651, filed May 31, 2018.

BACKGROUND OF THE INVENTION

1. Technical Field

The invention relates to touch panels, particularly to a method for reducing local impedance of a transparent conductive film and product thereof.

2. Related Art

Metal oxide such as indium tin oxide (ITO) is frequently used to be a material of transparent conductive films applied in various transparent touch panels because of its transmittance and conductivity. However, transmittance of ITO is inversely proportional to conductivity thereof. That is, the higher the transmittance is, the lower the conductivity is. For example, when surface resistivity of a film is below 10 Ω/sq, transmittance of visible light of the film can reach 80%, if transmittance is wanted to reach 90%, surface resistivity will be over 100 Ω/sq. As a result, conventional ITO transparent conductive films suffer in double limitations of transmittance and conductivity.

Most touch sensors are made of transparent indium tin oxide (ITO) films, on which touch sensing electrodes and their signal paths are formed. However, recent electronic products tend toward compactness and precision, so touch sensing electrodes and signal paths become tinier and tinier in size. Narrowed ITO sensing electrodes and signal paths will increase impedance to attenuate signals. It is adverse to signal transmission. Accordingly, a serious problem to large-sized touch panels is hard to be overcome.

SUMMARY OF THE INVENTION

An object of the invention is to provide a transparent touch sensor using a transparent conductive film with low local impedance, which can decrease thickness of a transparent conductive film to increase transmittance and save material cost. Also, this can increase conductivity and signal transmission efficiency of a local area to be advantageous to design of large-sized touch panels and can expand an available range of transparent conductive films applied in touch sensors.

To accomplish the above object, the transparent touch sensor includes:

a transparent first sensing layer, made of a metal oxide or graphene, and having first capacitive sensing strings and first electromagnetic antenna strings, wherein each first capacitive sensing string is composed of first capacitive sensing units arranged in series along a first direction, an end of each first capacitive sensing string is provided with a first capacitive signal contact, the first electromagnetic antenna strings are arranged along the first direction, an end of each first electromagnetic antenna string is provided with a first electromagnetic signal contact and another end thereof is connected to a first connecting wire, the first connecting wire connects the first electromagnetic antenna strings in series, each of the first capacitive sensing strings and the first electromagnetic antenna strings is connected with a first conductive element along the first direction, and the first conductive element is formed by a tiny wire made of gold, silver, copper, aluminum, molybdenum, nickel or an alloy thereof;

a transparent second sensing layer, made of a metal oxide or graphene, and having second capacitive sensing strings and second electromagnetic antenna strings, wherein each second capacitive sensing string is composed of second capacitive sensing units arranged in series along a second direction, an end of each second capacitive sensing string is provided with a second capacitive signal contact, the second electromagnetic antenna strings are arranged along the second direction, an end of each second electromagnetic antenna string is provided with a second electromagnetic signal contact and another end thereof is connected to a second connecting wire, the second connecting wire connects the second electromagnetic antenna strings in series, each of the second capacitive sensing strings and the second electromagnetic antenna strings is connected with a second conductive element along the second direction, and the second conductive element is formed by a tiny wire made of gold, silver, copper, aluminum, molybdenum, nickel or an alloy thereof; and a transparent insulative layer sandwiched between the first sensing layer and the second sensing layer for isolation and insulation;

wherein the first direction is orthogonal to the second direction, the first capacitive sensing strings are crossed with the second capacitive sensing strings to make each first capacitive sensing unit and corresponding one of the second capacitive sensing units form a complementary pattern, the first capacitive sensing units and the second capacitive sensing units jointly form a grid-shaped capacitive sensing unit matrix, and the first electromagnetic antenna strings are crossed with the second electromagnetic antenna strings to jointly form a grid-shaped electromagnetic antenna matrix.

DETAILED DESCRIPTION OF THE INVENTION

Figure 1:
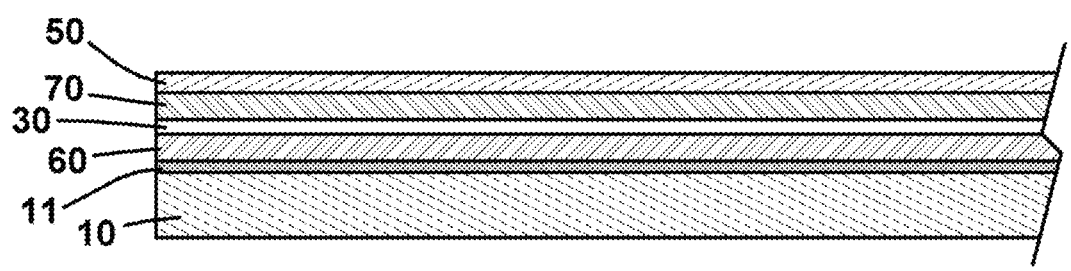
FIG. 1 is a schematic view of a laminated structure of the touch sensor of the invention.
Figure 2:
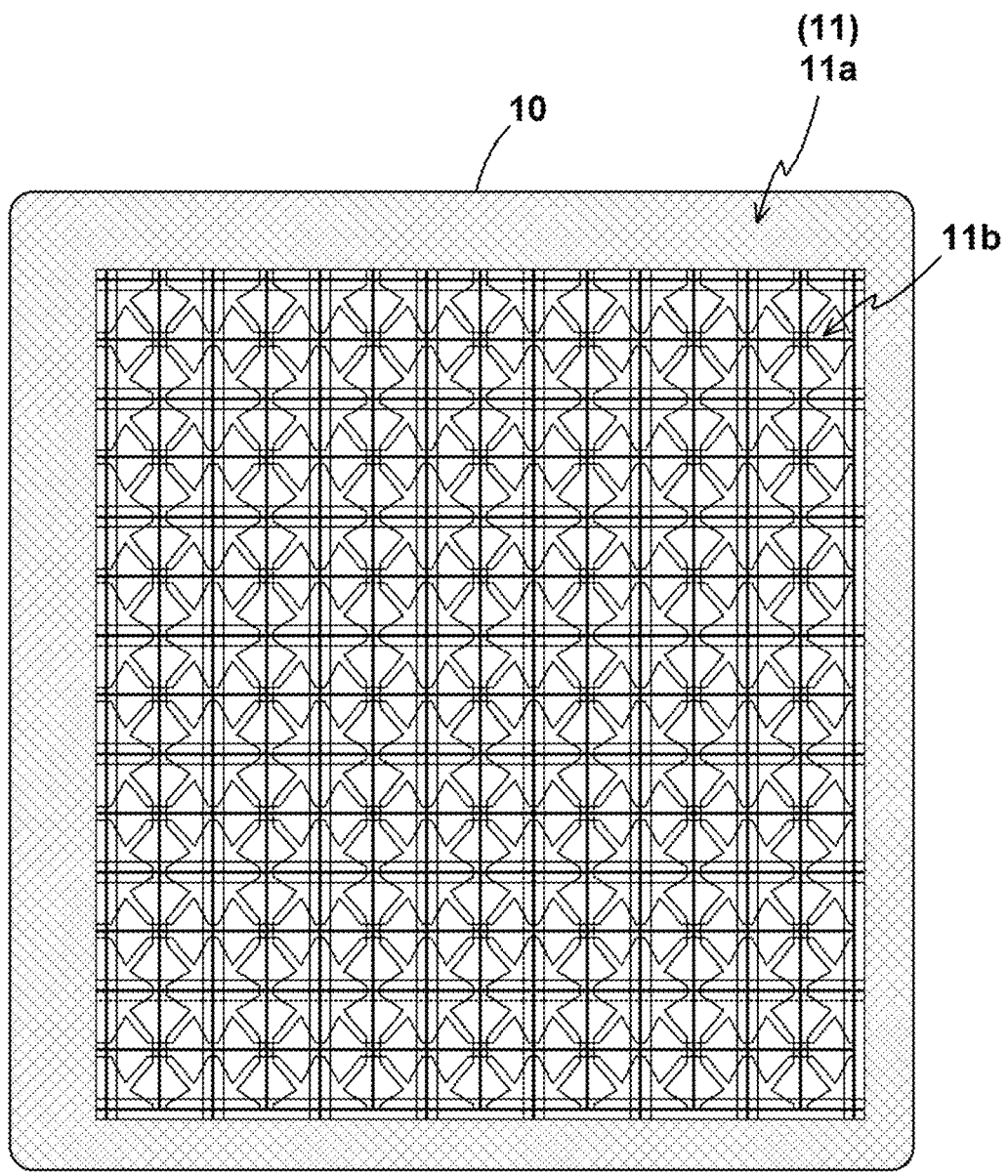
FIG. 2 is a top view of the touch sensor of the invention.
Figure 3:
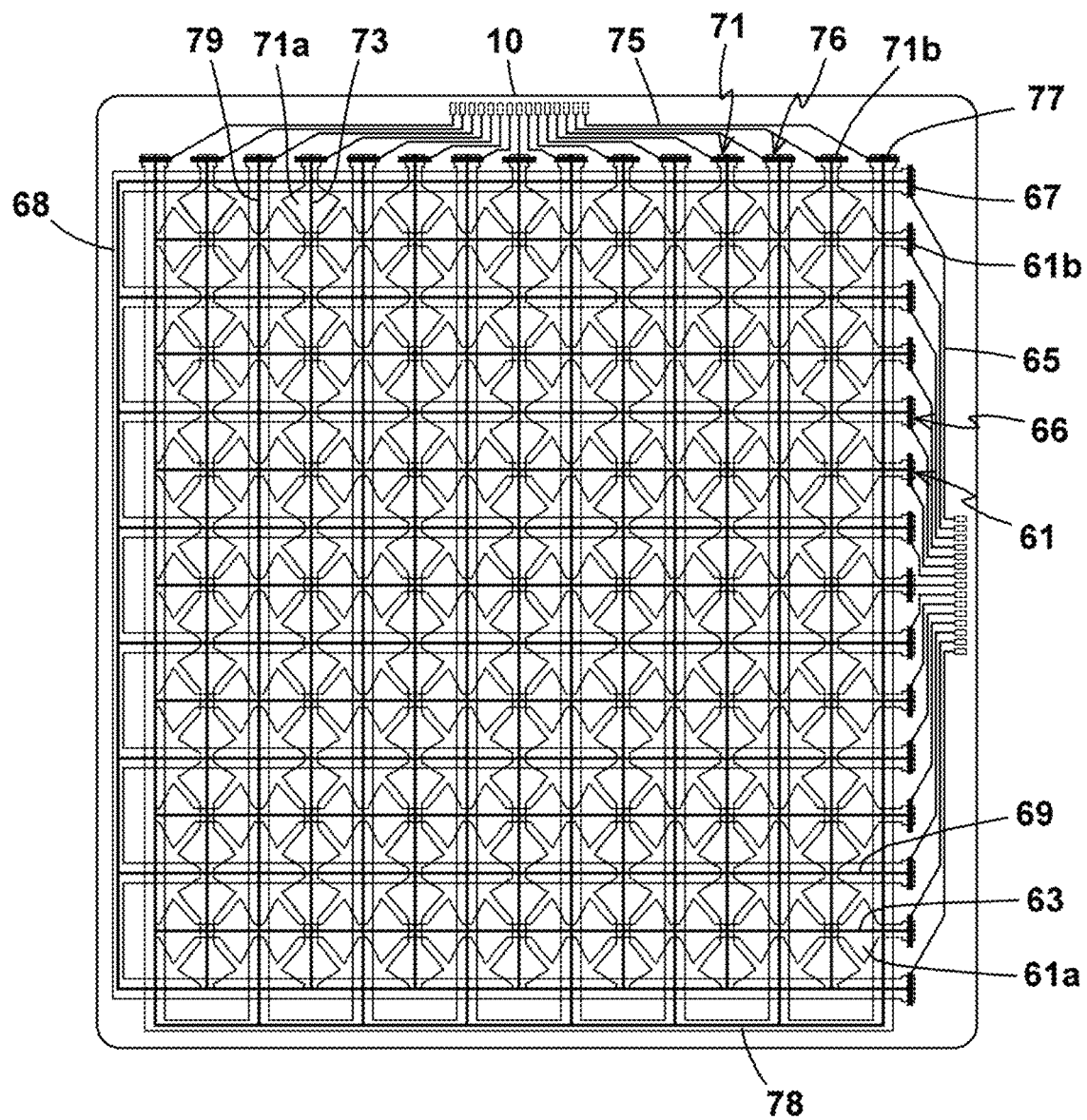
FIG. 3 is a bottom view of the touch sensor of the invention.
Figure 4:
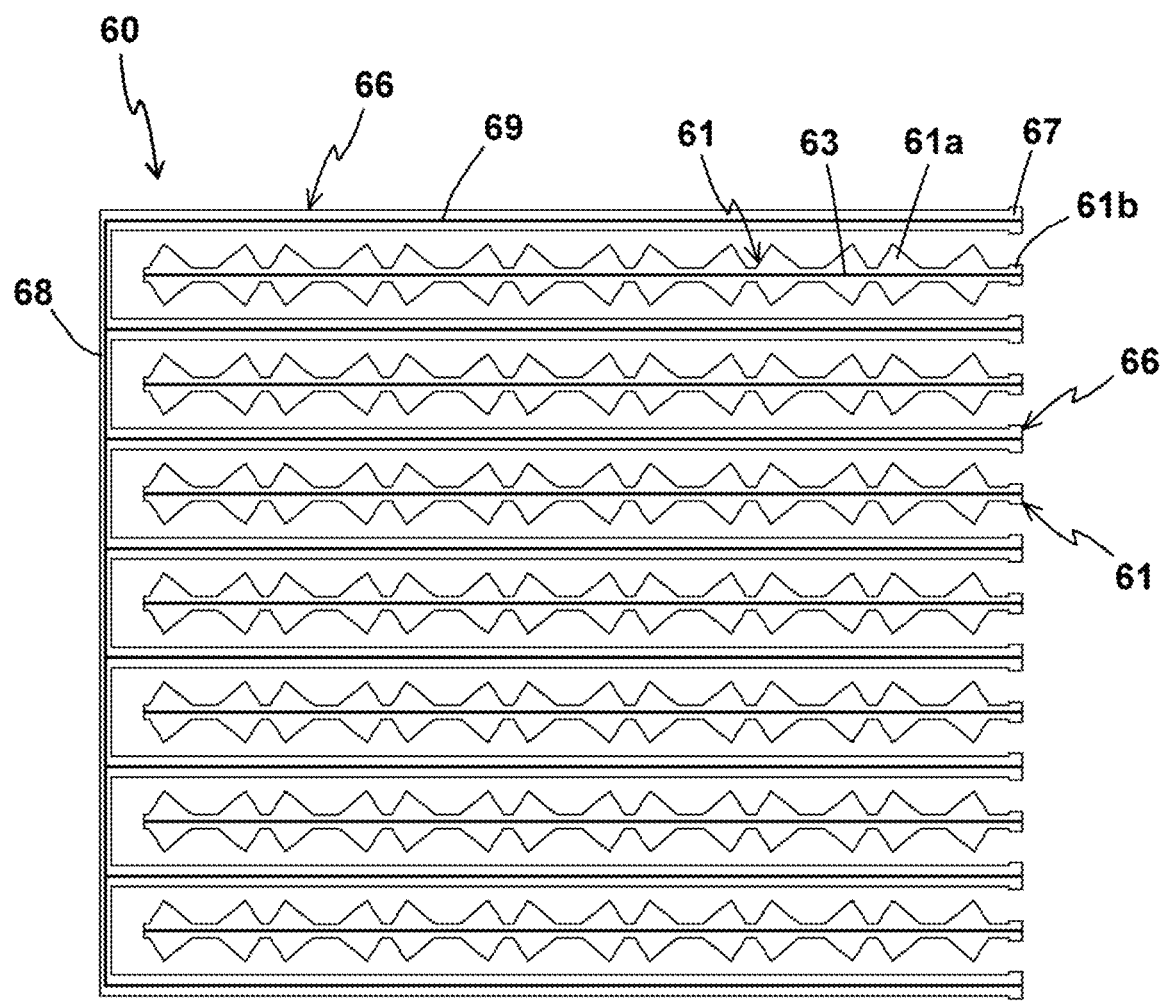
FIG. 4 is a plan view of the X-axis sensing layer of the touch sensor of the invention.
Figure 5:
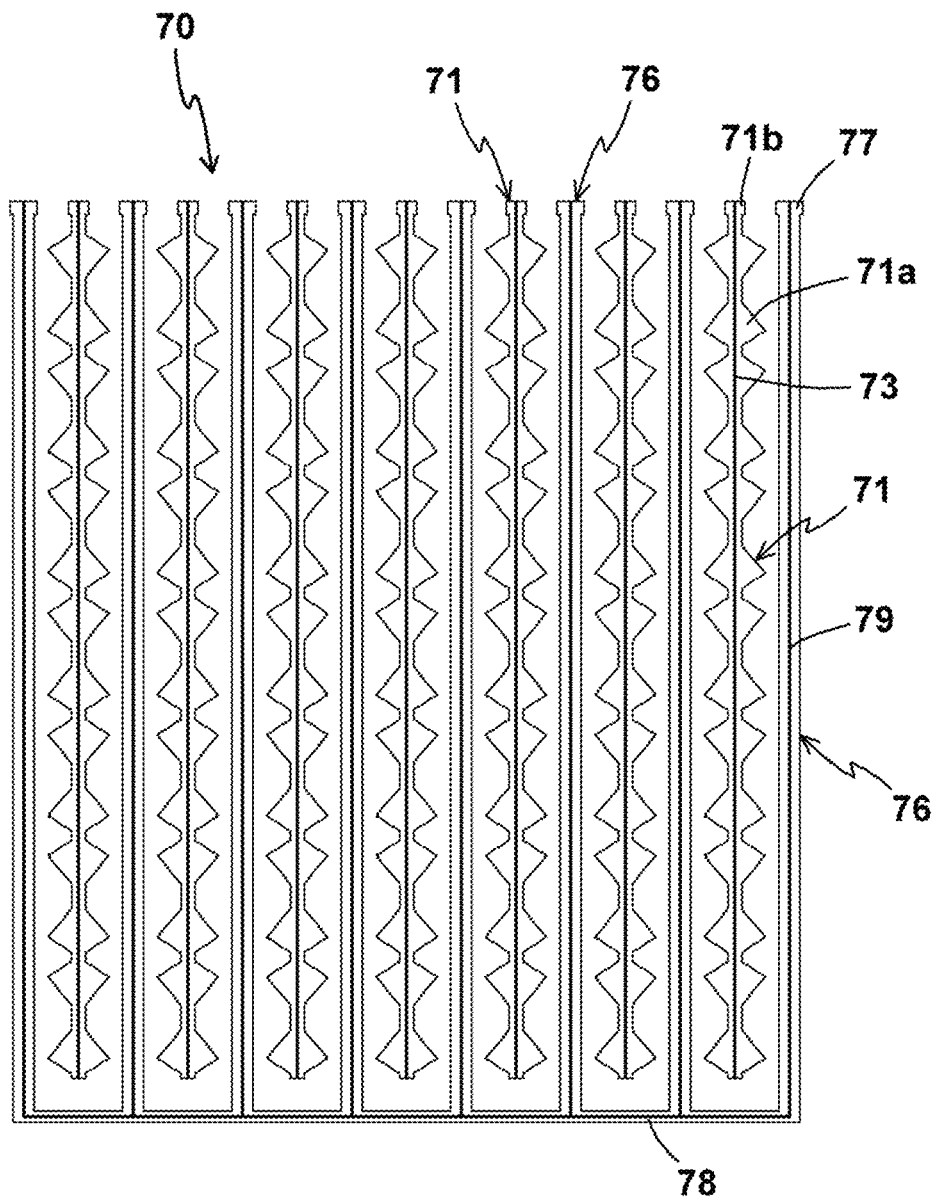
FIG. 5 is a plan view of the Y-axis sensing layer of the touch sensor of the invention.

Please refer to FIGS. 1-5, which show a complex transparent touch sensor structure with both a capacitive touch sensor and an electromagnetic touch sensor of the invention. The invention utilizes conductive units with high conductivity (hereinafter "tiny metal wires") disposed on touch sensing strings or antenna strings to reduce impedance. Thus, both high transmittance and high signal conductivity can be obtained.

The complex transparent touch sensor structure includes a base layer 10, an X-axis sensing layer 60, an insulative layer 30, a Y-axis sensing layer 70 and a cover layer 50. The base layer 10 is a glass thin plate with great mechanical strength and high transmittance. A periphery of the base layer 10 is provided with a colored bezel 11 formed by an insulative black matrix (BM) material. The colored bezel 11 defines a shaded area 11*a* on the base layer 10 and a visible area 11*b* surrounded by the shaded area 11*a*.

The X-axis sensing layer 60 is disposed in the visible area 11*b* and includes multiple rows of both X-axis capacitive sensing strings 61 and X-axis electromagnetic antenna strings 66. The X-axis capacitive sensing strings 61 and the X-axis electromagnetic antenna strings 66 are arranged to be parallel with each other at regular intervals. Each X-axis capacitive sensing string 61 is composed of rhombic capacitive sensing units 61*a* arranged in series along the X-axis direction. An end of each X-axis capacitive sensing string 61 is provided with a capacitive signal contact 61*b*. Each X-axis capacitive sensing string 61 has a tiny metal wire 63 arranged along the X-axis direction and electrically connected with both the capacitive signal contact 61*b* and the capacitive sensing units 61*a*. The X-axis electromagnetic antenna strings 66 are arranged along the X-axis direction. An end of each X-axis electromagnetic antenna string 66 is provided with an electromagnetic signal contact 67 and another end thereof is connected to a connecting wire 68. The connecting wire 68 connects the X-axis electromagnetic antenna strings 66 in series. Each of the X-axis electromagnetic antenna strings 66 is connected with a tiny metal wire 69 along the X-axis direction and the tiny metal wire 69 is electrically connected with the electromagnetic contact 67 and the connecting wire 68.

The Y-axis sensing layer 40 is disposed in the visible area 11*b* and includes multiple rows of both Y-axis capacitive sensing strings 71 and Y-axis electromagnetic antenna strings 76. The Y-axis capacitive sensing strings 71 and the Y-axis electromagnetic antenna strings 76 are arranged to be parallel with each other at regular intervals. Each Y-axis capacitive sensing string 71 is composed of rhombic capacitive sensing units 71*a* arranged in series along the Y-axis direction. An end of each Y-axis capacitive sensing string 71 is provided with a capacitive signal contact 71*b*. Each Y-axis capacitive sensing string 71 has a tiny metal wire 73 arranged along the Y-axis direction and electrically connected with both the capacitive signal contact 71*b* and the capacitive sensing units 71*a*. The Y-axis electromagnetic antenna strings 76 are arranged along the Y-axis direction. An end of each Y-axis electromagnetic antenna string 76 is provided with an electromagnetic signal contact 77 and another end thereof is connected to a connecting wire 78. The connecting wire 78 connects the Y-axis electromagnetic antenna strings 76 in series. Each of the Y-axis electromagnetic antenna strings 76 is connected with a tiny metal wire 79 along the Y-axis direction and the tiny metal wire 79 is electrically connected with the electromagnetic contact 77 and the connecting wire 78.

Both the capacitive signal contacts 61*b*, 71*b* and the electromagnetic signal contacts 67、77 on both the X-axis and the Y-axis sensing layers 60, 70 are disposed in the shaded area 11*a* and send touch signals to a signal processor (not shown) via signal wires 65, 75.

The X-axis and Y-axis sensing layers 60, 70 are formed by transparent conductive films made of metal oxide such as indium tin oxide (ITO). The tiny metal wires 63, 69, 73, 79 adopt a material with low resistance such as copper. Because the tiny metal wires 63, 69, 73, 79 possess a lower impedance than those of the X-axis and Y-axis sensing layers 60, 70, connecting the tiny metal wires 63, 69, 73, 79 to both the X-axis and Y-axis sensing strings 61, 71 and the X-axis and Y-axis electromagnetic antenna strings 66, 76 can enhance transmission effect of touch signals and effectively reduce an impedance between each capacitive sensing string 61, 71 or electromagnetic antenna string 66, 76 and the contacts 61*b*, 71*b*, 67, 77 connected thereto to reduce attenuation in transmission of touch signals. It is noted that each of the tiny metal wires 63, 73 is set to be below 5 μm in width. Such a nanoscale metal wire is still invisible by the naked eye even if it is made of an opaque material, so it is suitable to be used in the visible area 11 without reducing visibility of the transparent touch sensor.

The X-axis and Y-axis sensing layers 60, 70 are insulatively separated by the transparent insulative layer 30. The X-axis and Y-axis capacitive sensing strings 61, 71 on the two sensing layers are orthogonal to each other to make each capacitive sensing unit 61*a*, 71*a* form a complementary pattern and all of the capacitive sensing units 61*a*, 71*a* jointly form a grid-shaped capacitive sensing unit matrix. The X-axis and Y-axis electromagnetic antenna strings 66, 76 are orthogonal to each other to jointly form a grid-shaped electromagnetic antenna matrix. The transparent insulative layer 30 may be made of optical clear adhesive (OCA) or optical clear resin (OCR) to paste the two layers 60、70. Additionally, the cover layer 50 is adhered on the Y-axis sensing layer 40 for protection. The cover layer 50 is an insulative film with high transmittance.

In sum, the invention utilizes a transparent conductive layer as a base material and connecting the tiny metal wires 63, 69, 73, 79 to both the X-axis and Y-axis sensing strings 61, 71 and the X-axis and Y-axis electromagnetic antenna strings 66, 76 to reduce impedance in the transmission paths of the touch signals. As a result, a capacitive touch sensor can be integrated with an electromagnetic touch sensor to form a transparent touch sensor structure with double touch sensing, which can be disposed on a screen. Also, increasing the quality of touch signal transmission is advantageous to both design and manufacture of touch panels with a larger size and thickness of the conductive film as a touch sensing layer can be reduced so that the material cost can be saved and transmittance of the touch sensing layer can be enhanced. In addition, the tiny metal wires 63, 69, 73, 79 are nanoscale in width, so they are substantially invisible and their occupation ratio to the whole area is below 0.3%. The light blocking rate is very low, almost all area of the touch sensing layer is light-permeable, so the transmittance is very great. Therefore, the tiny metal wires disposed in the sensing strings can effectively reduce impedance of the sensing strings and increase the efficiency of the signal transmission, but the visibility is not substantially affected.

Further, the tiny metal wires 63, 69, 73, 79 may be continuous straight lines as shown, a waved line or other regular or irregular shapes is also available. In other available solutions, the tiny metal wires may be composed of line segments or a plurality of lines parallelly arranged.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A transparent touch sensor comprising:
   a transparent first sensing layer, made of a metal oxide or graphene, and having first capacitive sensing strings and first electromagnetic antenna strings, wherein each first capacitive sensing string is composed of first capacitive sensing units arranged in series along a first direction, an end of each first capacitive sensing string is provided with a first capacitive signal contact, each first capacitive sensing unit is of a rhombic shape, each of the first electromagnetic antenna strings is of a linear shape and along the first direction, an end of each first electromagnetic antenna string is provided with a first electromagnetic signal contact and another end thereof is connected to a first connecting wire, the first connecting wire connects the first electromagnetic antenna strings in series, each of the first capacitive sensing strings and the first electromagnetic antenna strings is connected with a first conductive element along the first direction;

a transparent second sensing layer, made of a metal oxide or graphene, and having second capacitive sensing strings and second electromagnetic antenna strings, wherein each second capacitive sensing string is composed of second capacitive sensing units arranged in series along a second direction, an end of each second capacitive sensing string is provided with a second capacitive signal contact, each second capacitive sensing unit is of a rhombic shape, each of the second electromagnetic antenna strings is of a linear shape and along the second direction, an end of each second electromagnetic antenna string is provided with a second electromagnetic signal contact and another end thereof is connected to a second connecting wire, the second connecting wire connects the second electromagnetic antenna strings in series, each of the second capacitive sensing strings and the second electromagnetic antenna strings is connected with a second conductive element along the second direction; and a transparent insulative layer sandwiched between the first sensing layer and the second sensing layer for isolation and insulation;

wherein the first direction is orthogonal to the second direction, the first capacitive sensing strings are crossed with the second capacitive sensing strings to make each first capacitive sensing unit and corresponding one of the second capacitive sensing units form a complementary pattern, the first capacitive sensing units and the second capacitive sensing units jointly form a grid-shaped capacitive sensing unit matrix, and the first electromagnetic antenna strings are crossed with the second electromagnetic antenna strings to jointly form a grid-shaped electromagnetic antenna matrix; and wherein each of the first conductive element and the second conductive element is formed by a tiny wire made of gold, silver, copper, aluminum, molybdenum, nickel or an alloy thereof, and a width of each of the tiny wires is less than 5 µm.

2. The transparent touch sensor of claim 1, wherein the first capacitive sensing strings and the first electromagnetic antenna strings are arranged to parallel to each other at regular intervals, and the second capacitive sensing strings and the second electromagnetic antenna strings are arranged to parallel to each other at regular intervals.

* * * * *